3,519,696
PROCESS FOR PREPARING COPOLYMERS OF TRIOXANE
Harald Cherdron, Wiesbaden, and Edgar Fischer and Hans-Dieter Hermann, Frankfurt am Main, Germany, assignors to Farbwerke Hoechst Aktiengesellschaft vormals Meister Lucius and Bruning, Frankfurt am Main, Germany, a corporation of Germany
No Drawing. Filed Dec. 8, 1967, Ser. No. 689,003
Claims priority, application Germany, Dec. 30, 1966, F 51,120
Int. Cl. C08g 1/16
U.S. Cl. 260—823            4 Claims

ABSTRACT OF THE DISCLOSURE

Copolymers of trioxane with cyclic ethers or cyclic acetals are prepared by cationic polymerization of the monomer mixture at a temperature exceeding the melting point of the trioxane in containers made of thermoplastic materials.

---

The present invention provides a process for preparing copolymers of trioxane.

It is possible to polymerize trioxane and to copolymerize it with cyclic ethers in substance, in the melt, in the gaseous phase, in suspension and in solution. The cationic polymerization in substance at a temperature exceeding the melting point of monomeric trioxane (62° C.) is especially interesting. Several discontinuous and continuous embodiments of that polymerization process have already been disclosed. German patent specification No. 1,137,215, laid open to public inspection, discloses inter alia the polymerization on an endless conveyor band and Belgian Pat. No. 585,980 discloses the discontinuous polymerization carried out in containers made of plastic materials, for example of polyethylene. The last-mentioned process has many advantages, for example an easy dissipation of polymerization heat and the possibility of polymerizing in any layer thickness desired; moreover, this process can be carried out without heavy technical expenditure, although, after the polymerization, the polymeric trioxane has to be removed from the polyethylene containers by a separate operation. The same drawbacks are inherent in the process disclosed in German patent specification No. 1,225,389 laid open to public inspection.

We have now found that copolymers of trioxane can advantageously be prepared from mixtures of from 50 to 99.9% by weight of trioxane and from 0.1 to 50% by weight of cyclic ethers or cyclic acetals in the presence of from 0.0001 to 1.0% by weight of cation-active catalysts at temperatures in the range of from 62 to 115° C. in containers made from thermoplastic materials, by carrying out the polymerization of said mixtures in films or sheets of polyacetals having a melting point in the range of from 120 to 180° C. and a thickness in the range of from 0.01 to 1.0 millimeter, and subsequently crushing the polymer together with the film or sheet and then working them up.

By operating according to the process of the invention, the polymerization containers need not be removed prior to the work-up. The process is substantially less complicated; for, hitherto, removing the polymerization containers, for example when polyethylene was used as the container material, required not only a separate operation but also a special care, since polyethylene is insoluble under the work-up conditions so that even small amounts of this material cause cloggings in the pumps and dies. Moreover, these proportions of polyethylene are inhomogeneously mixed into the finished product, thus having a very detrimental effect on its mechanical properties; this drawback is also avoided by the process of the invention.

The polymerization process of the invention can be carried out discontinuously and continuously. For a discontinuous polymerization, for example flat bags or sacks made of polyacetals are filled with molten trioxane and the comonomer, and after the initiator has been added, these bags are introduced into a thermostat. The continuous polymerization may be carried out by suspending flat bags made of polyacetals from a moving band or rope in such a manner that they can be continuously charged with liquid trioxane, the comonomer and the initiator by means of a dosing device and they are then passed through an air- or liquid bath having a certain temperature, and—after the polymerization—into a hydrolysis vessel. The continuous polymerization may also be carried out in flat pipes made of polyacetals instead of bags. These pipes of polyacetals may either be produced by welding two strips together or directly by blow extrusion.

The polyacetals used are homopolymers of formaldehyde or trioxane, the terminal groups of which are blocked, for example by esterification or etherification, as well as copolymers of formaldehyde or trioxane, preferably copolymers of trioxane with cyclic ethers or cyclic acetals, for example with 0.1 to 15% by weight of ethylene oxide or with dioxolane. The polyacetals used as container materials must, of course, be insoluble in the molten trioxane or in the mixture of the monomers under the reaction conditions. Polyacetals, the crystallite melt points of which are in the range of from 120 to 180° C., preferably from 145 to 170° C., are preferred. For preparing the pipes suitable as polymerization containers, terpolymers of trioxane are preferably used.

Especially preferred are films or sheets made from terpolymers of from 98.99 to 89.0% by weight of trioxane, from 1 to 10% by weight of cyclic ethers and/or cyclic formals and from 0.01 to 1% by weight of butanediol diglycidyl ethers, as well as films or sheets made from terpolymers of from 99.9 to 80% by weight of trioxane, from 0 to 10% by weight of a cyclic ether and from 0.1 to 10% by weight of a triol-formal, preferably hexane-triol formal.

In comparison with films or sheets made from formaldehyde- or trioxane-homopolymers, the terpolymers have the advantage of being more easily soluble when worked up in solution or more readily miscible with the polymer prepared when worked up in the melt.

The copolymerization is carried out in substance at temperatures in the range of from the melting point of trioxane (62° C.) to the boiling point thereof (115° C.) and is initiated by the known cation-active catalysts. Suitable initators are, for example, inorganic or organic acids, acid halides and, especially Ansolvo-acids (defined by Kortüm, Lehrbuch der Elektrochemie, Wiesbaden 1948, pages 300 and 301), among which boron fluoride and its complex compounds, for example boron fluoride etherates, are very well suitable. Especially useful are the diazonium fluoroborates known from Belgian Pats. Nos. 593,648 and 618, 213, and the compounds known from Belgian Pat. No. 585,980. The concentration of the initators may vary within wide limits. It depends on the nature of the initiator chosen and on the molecular weight intended for the polymer to be prepared. It may be in the range of from 0.0001 to 1% by weight, preferably from 0.001 to 0.1% by weight, calculated on the monomer mixture. Since these initiators tend to decompose the polymer, it is advisable to deactivate them immediately after the polymerization, for example by means of ammonia.

As comonomers for trioxane there are predominantly used cyclic ethers or cyclic acetals, for example compounds of the general Formula I (I) 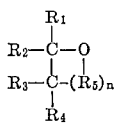

in which $R_1$ to $R_4$ are identical or different, each representing a hydrogen atom, an alkyl radical or an alkyl radical substituted by halogen atoms, $R_5$ represents a methylene- or oxymethylene radical or a methylene- or oxymethylene radical substituted by alkyl groups or halogen-alkyl groups, $n$ being zero or an integer of from 1 to 3, or $R_5$ represents the radical

$n$ being 1 and $m$ being an integer of from 1 to 3. The above-mentioned alkyl radicals contain from 1 to 5 carbon atoms and may be substituted by 0 to 3 halogen atoms, preferably chlorine atoms.

As cyclic ethers or cyclic acetals there are especially useful ethylene oxide, glycol formal and diglycol formal. Furthermore, propylene oxide, epichlorhydrin and 4-chloromethyl-dioxolane may also be used.

Finally, there are also useful cyclic or linear formals of long chain $\alpha,\omega$-diols, for example butane-diol formal or hexane-diol formal.

It is possible to copolymerize from 0.05 to 50, preferably from 0.1 to 10% by weight of these comonomers with trioxane.

The polymerization containers and the polymer contained therein may be simultaneously crushed or pulverized in various manner, for example in a cross beater mill.

The work-up consists in neutralizing the initiator, removing the residual monomers and reducing the unstable terminal groups to a single comonomer component. When boron trifluoride or its complex compounds are used as the preferred initiators, the neutralization may be effected by suspending the crude polymer in a liquid suspending medium containing a base, for example ammonia or amines, such as triethyl amine or cyclohexylamine. The amount of the base depends on the initiator concentration and generally ranges from 0.1 to 2% by weight, calculated on the polymer. This neutralization is preferably effected in a suspending medium which is also a solvent for the monomers, for example methylene chloride, cyclohexane or especially mixtures of water and methanol, since then the residual monomers are removed by the same operation.

The unstable terminal groups are subjected to a thermal degradation, preferably in an alkaline medium, either in solution or in the melt. Suitable solvents are, for example, mixtures of alcohol and water or benzyl alcohol at a temperature in the range of from 120 to 180° C., to which solvents from 0.01 to 2% by weight of amines, for example ammonia, triethyl amine or triethanol amine, may be added to accelerate the degradation. For the degradation of the unstable terminal groups in the melt, the polymer is kneaded in an appropriate vessel at a temperature exceeding its melting point, advantageously in the presence of stabilizers, for example phenols or combinations of aromatic amines with (poly)-amides. This degradation in the melt can be accelerated by adding from 0.01 to 2% by weight of amines, such as ammonia, triethyl amine or triethanol amine or the solutions thereof in water or mixtures of alcohol and water.

The products prepared according to the process of the invention can be thermoplastically processed into shaped articles.

The following examples serve to illustrate the present invention, but they are not intended to limit it thereto.

EXAMPLE 1

20 milligrams of p-nitrophenyl-diazonium-fluoroborate were put in a bag made of a copolymer of trioxane and ethylene oxide (weight ratio 98:2), having a wall thickness of 50μ, and then 100 milliliters of freshly distilled liquid trioxane and 2 grams of ethylene oxide were added thereto. The closed bag was subsequently introduced into a drying cabinet at 70° C. and after 30 minutes it was dissolved in 1 liter of benzyl-alcohol containing 10 milliliters of triethanol amine, at a temperature of 150° C. After 30 minutes, the perfectly clear solution was allowed to cool, the precipitated copolymer was filtered with suction, boiled with methanol and dried in vacuo. The yield was 90.6% of the theoretical yield; the reduced specific viscosity was 1.38 dl. per gram (measured in γ-butyrolactone +2% of diphenyl amine at 140° C.).

EXAMPLE 2

20 milligrams of p-nitrophenyl-diazonium-fluoroborate were put in a bag made of a terpolymer of trioxane, ethylene oxide and butane-diol diglycidyl ether (weight ratio 97.95:2.0:0.05), having a wall thickness of 50μ, and subsequently 140 milliliters of freshly distilled liquid trioxane and 3 grams of ethylene oxide were added thereto. The closed bag was then hung for 20 minutes in a water bath having a temperature of 80° C. and subsequently worked up in the manner disclosed in Example 1. The yield was 92.1%; the reduced specific viscosity was 0.81 dl./gram (measured in γ-butyrolactone +2% of diphenyl amine at 140° C.

EXAMPLE 3

A bag made of a terpolymer of trioxane, ethylene oxide and hexane-triol formal (weight ratio 97.9:2.0:0.1), having a wall thickness of 70μ, was filled with 100 milliliters of freshly distilled liquid trioxane and 2 grams of ethyleneoxide and 15 milligrams of boron fluoride dibutyl etherate were added thereto by means of a syringe. The closed bag was hung for 20 minutes in a water bath having a temperature of 72° C. and subsequently worked up in the manner disclosed in Example 1.

The yield was 90.8%; the reduced specific viscosity was 0.77 dl./gram (measured in γ-butyrolactone +2% of diphenyl amine at 140° C.

What is claimed is:

1. A process for preparing a copolymer of trioxane by polymerizing a mixture of from 50 to 99.9% by weight of trioxane and from 50 to 0.1% by weight of a cyclic ether or cyclic acetal in the presence of from 0.0001 to 1.0% by weight of a cation-active initiator at a temperature in the range of the melting point to the boiling point of trioxane, which process comprises carrying out the polymerization of said monomers in a container composed of a thermoplastic polyacetal having a crystallite melting point in the range of from 120 to 180° C., and subsequently crushing and working up the polymer thus formed together with the container.

2. The process of claim 1, wherein the cyclic ethers or cyclic acetals used are compounds of the Formula I (I) 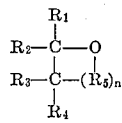

in which $R_1$ to $R_4$ are identical or different, each representing a hydrogen atom, an alkyl radical or an alkyl radical substituted by up to 3 halogen atoms, and $R_5$ represents a methylene- or oxymethylene radical or a methylene- or oxymethylene radical substituted by alkyl groups or by halogen-alkyl groups, $n$ being zero or an integer of from 1 to 3, or $R_5$ represents the radical $-(O-CH_2-CH_2)_m-OCH_2-$, $n$ being 1 and $m$ being an integer of from 1 to 3.

3. The process of claim 1, wherein the container is made from a terpolymer of trioxane.

4. The process of claim 1, wherein the polyacetal container has a thickness in the range of from 0.01 to 1.0 millimeter.

References Cited

UNITED STATES PATENTS 2,617,782  11/1952  Paton et al. _____ 260—41.5

FOREIGN PATENTS 585,980  6/1960  Belgium.
1,125,389  9/1966  Germany.

SAMUEL H. BLECH, Primary Examiner

U.S. Cl. X.R.

260—67, 897